United States Patent [19]

Rhoads

[11] 3,955,430

[45] May 11, 1976

[54] DEVICE FOR PROVIDING RECIPROCATING ROTARY MOTION

[76] Inventor: Millard A. Rhoads, 1411 Lake Blvd., St. Joseph, Mich. 49085

[22] Filed: Apr. 8, 1974

[21] Appl. No.: 458,512

[52] U.S. Cl. .............................................. 74/89.2
[51] Int. Cl.² ...................................... F16H 27/02
[58] Field of Search .............................. 74/89.2, 70

[56] References Cited
UNITED STATES PATENTS

| | | | |
|---|---|---|---|
| 2,844,965 | 7/1958 | Stelljes et al........................... | 74/70 |
| 3,592,069 | 7/1971 | Welch.................................. | 74/89.2 |

OTHER PUBLICATIONS

Wilkes–Rolamite Research Report, SC–RR–67 656, Oct. 1967, pp. 179 and 191, 201–202, Table 5–3.

Primary Examiner—Benjamin W. Wyche
Assistant Examiner—Wesley S. Ratliff, Jr.
Attorney, Agent, or Firm—Oltsch & Knoblock

[57] ABSTRACT

A device which incorporates the Rolamite principle of utilizing an elongated band which passes around two confined rollers in S-shaped fashion. The Rolamite principle is utilized to convert fore and aft movement into reciprocating rotary motion.

4 Claims, 9 Drawing Figures

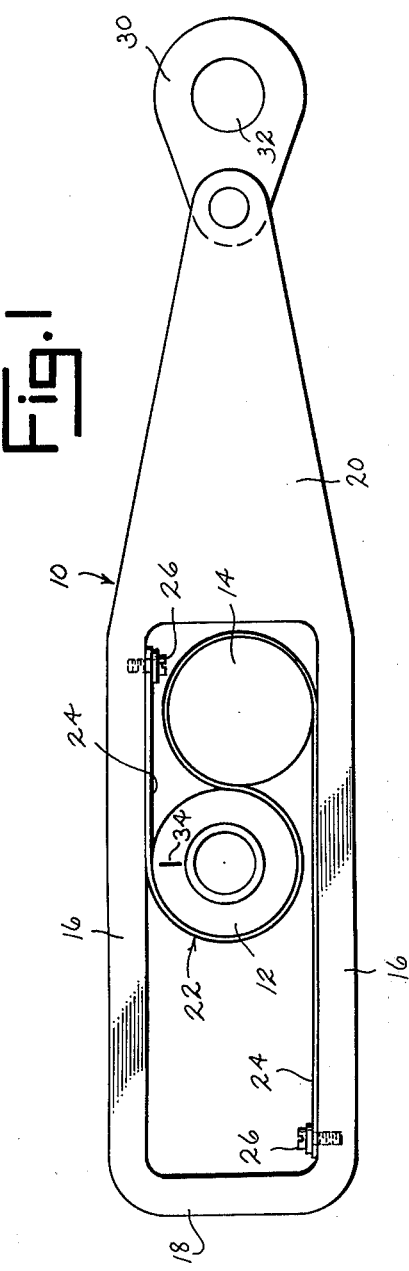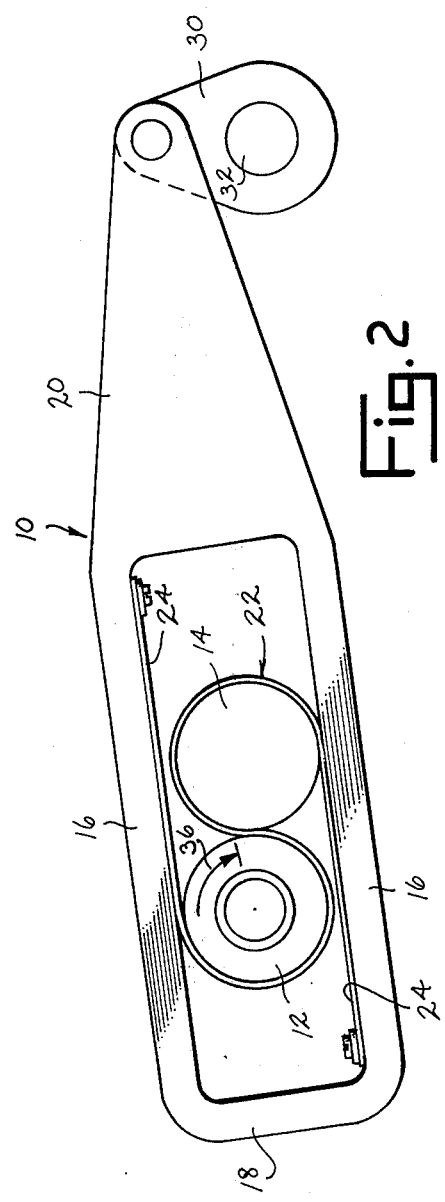

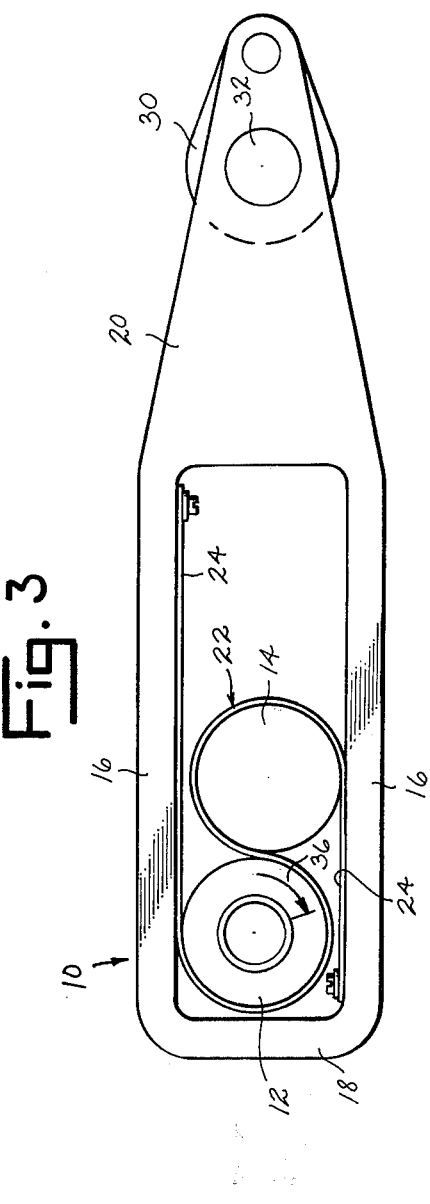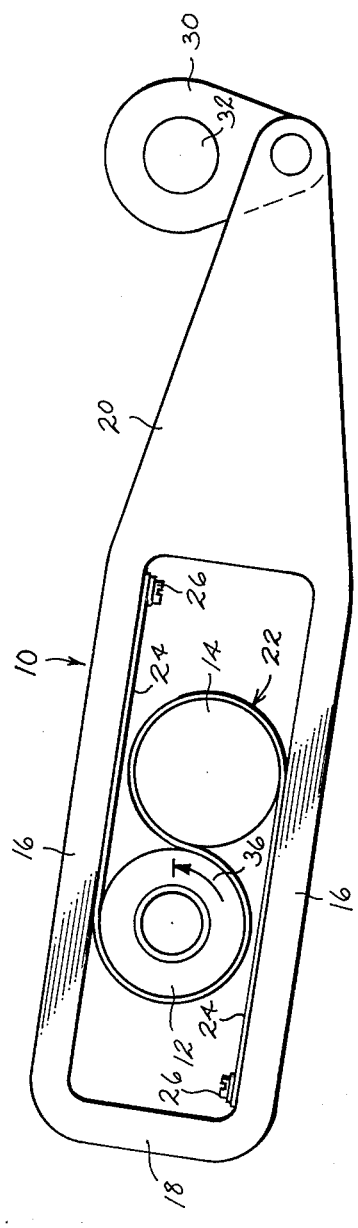

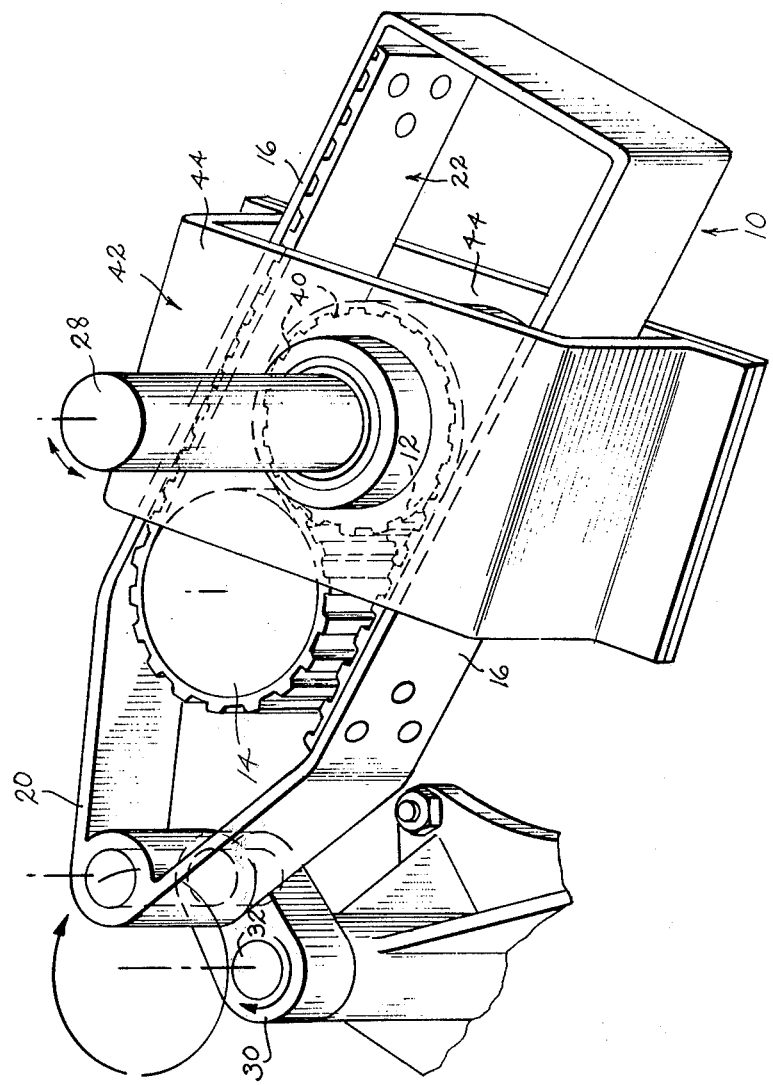

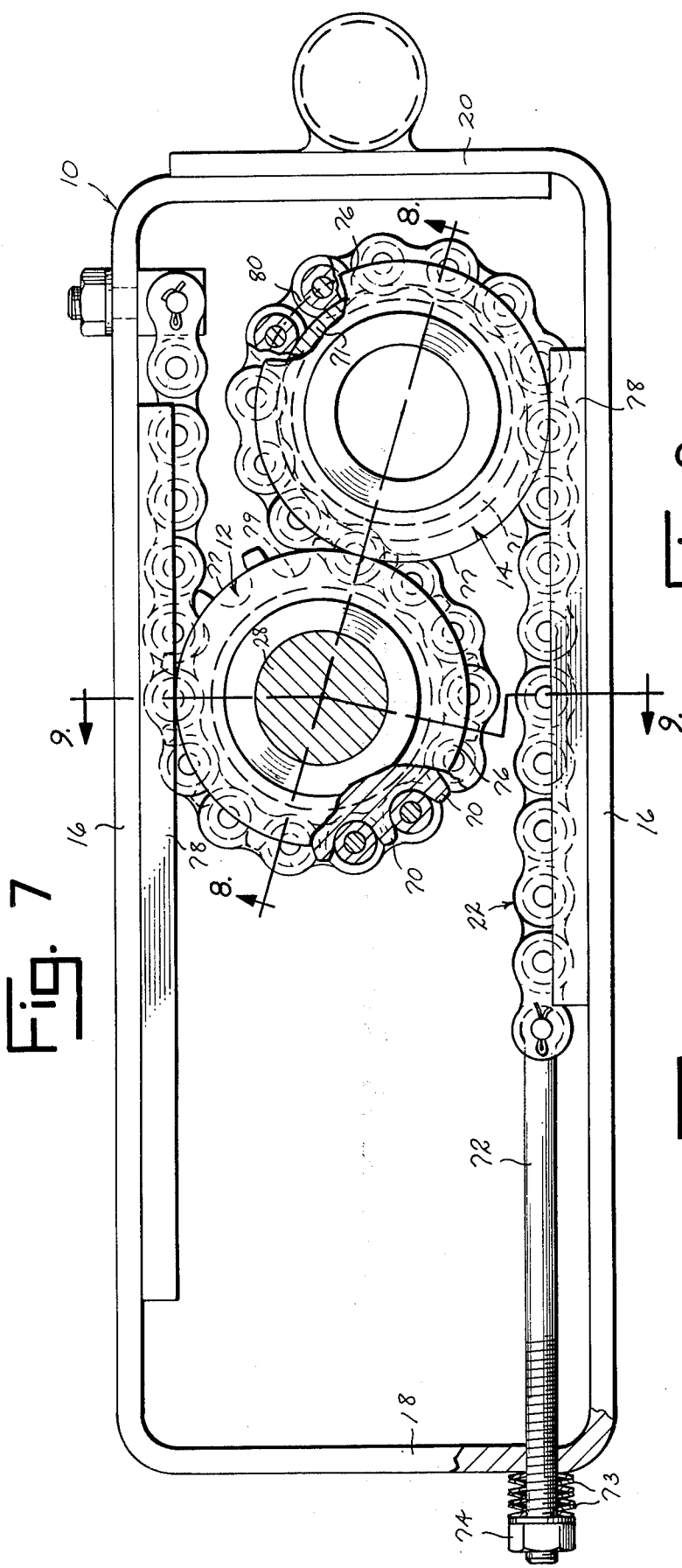
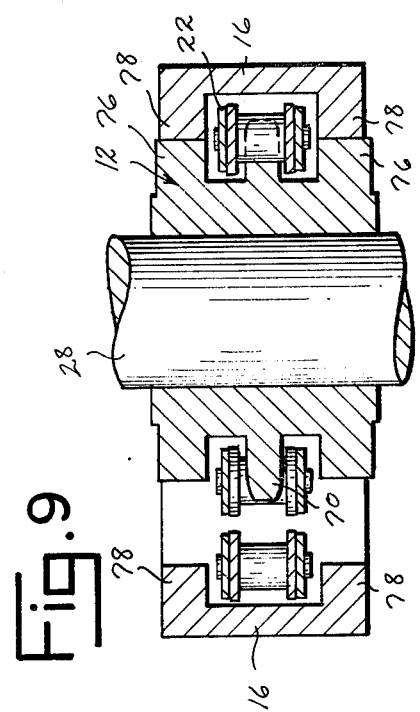
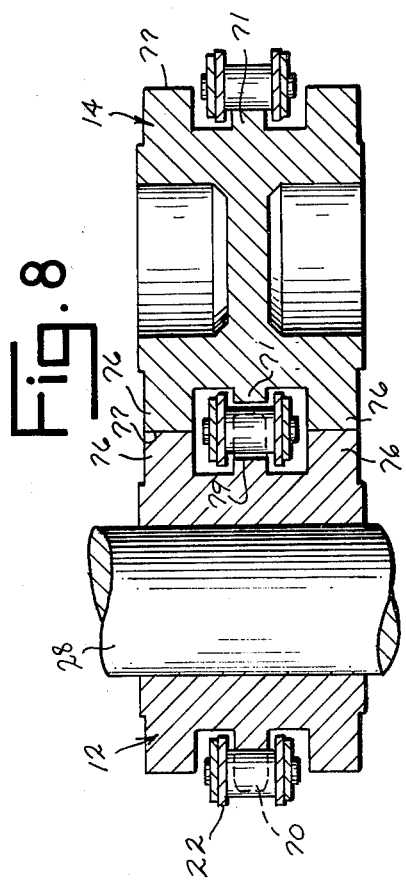

DEVICE FOR PROVIDING RECIPROCATING ROTARY MOTION

SUMMARY OF THE INVENTION

This invention relates to a motion transmitting device and has particular application to a device producing reciprocating rotary motion through the use of the Rolamite principle.

In this invention the motion transmitting device includes a frame and spaced apart side walls. An elongated flexible tensioning member extends along each of the frame side walls with the intermediate portion thereof passing around in an S-shaped configuration two rollers which are located within the frame and confined between the side walls thereof. One of the rollers includes a shaft or power output means. The frame is caused to experience fore and aft movement generally along the direction of the side walls thereof and within a plane transverse to the axis of rotation of the rollers so that through the Rolamite principle the one roller carrying the power output means will experience reciprocating rotational motion.

This motion transmitting device will have application in such apparatus as washing machines, windshield wiper mechanisms, heavy traffic door openers, mixers and blenders, steering gear mechanisms for wheeled vehicles, window openers, and radio tuners. The motion transmitting device will be essentially noiseless and can be produced at reduced cost, as compared to gear-type transmissions, through the elimination of the need for precise machining, gear case components, gaskets, shaft seals and gear oil. Additionally, the motion transmitting device of this invention may be designed so as to be essentially self lubricating and of long operating life.

Accordingly, it is an object of this invention to provide a motion transmitting device for producing reciprocating rotary motion and which is of economical construction and of long operative life.

Another object of this invention is to provide a motion transmitting device for producing generally noise-free reciprocating rotary motion.

Still another object of this invention is to provide a reciprocating rotary motion transmitting device having moving parts which experience rolling friction, thus reducing heat build up within the device and as a result reducing the power requirements therefor.

Other objects of this invention will become apparent upon a reading of the invention's description.

BRIEF DESCRIPTION OF THE DRAWINGS

FIGS. 1–4 are views of one embodiment of the motion transmission device shown in sequential operating form.

FIG. 5 is a fragmentary perspective view of the motion transmitting device shown in a more detailed form.

FIG. 7 is a view of another embodiment of the motion transmission device.

FIG. 8 is a sectional view taken along line 8—8 of FIG. 7.

FIG. 9 is a sectional view taken along line 9—9 of FIG. 7.

DESCRIPTION OF THE PREFERRED EMBODIMENTS

Figure 6:
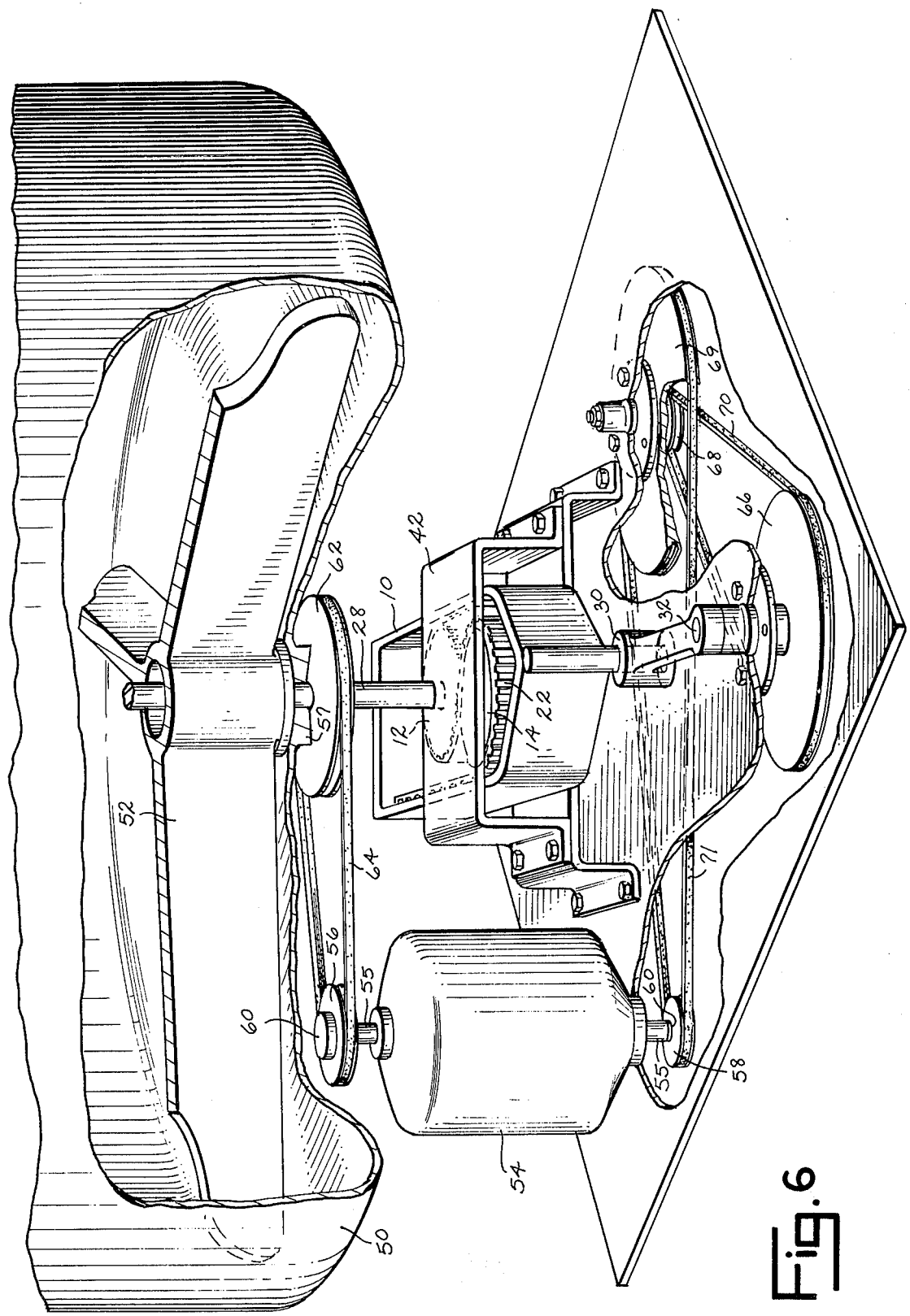
FIG. 6 is a fragmentary perspective view showing the motion transmitting device of FIG. 5 incorporated into a washing machine.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

In FIGS. 1–4 the basic concept of the subject invention is illustrated. A frame 10 encloses two rollers 12 and 14 having parallel axes of rotation and of a cylindrical configuration. Rollers 12 and 14 are located in the open center of frame 10 which is defined by side walls 16 and end parts 18 and 20. Side walls 16 of frame 10 parallel each other with the spacing therebetween being less than the combined diameters of rollers 12 and 14. The combined diameters of rollers 12 and 14 while exceeding the spacing between side walls 16 do not exceed the spacing between end parts 18 and 20 of the frame. An elongated flexible tension member 22 which is in the form of a band extends in S-shaped fashion around rollers 12 and 14 with each end portion 24 of the tension member being anchored at its end by a screw 26 to a side wall 16 adjacent one of the end parts of the frame. The construction of the motion transmitting device thus far described incorporates the Rolamite principle which was first disclosed in U.S. Pat. Nos. 3,452,175 and 3,452,309.

Roller 12 shown in FIGS. 1–4 constitutes the motion output roller. End part 20 of frame 10 is pivotally connected to a crank mechanism 30. Crank mechanism 30 is secured to a power driven shaft 32 having a fixed axis of rotation. Roller 12 is located by suitable bearing means (not shown) in a fixed position relative to power shaft 32. Rotation of shaft 32 causes frame 10 to move in an oscillating but generally fore and aft path along the direction of its side walls 16. In viewing the operation of the motion transmitting device as shown in FIGS. 1–4, shaft 32 will be rotated in a clockwise direction beginning in FIG. 1 with roller 12 being journaled for rotation about a fixed axis. A line mark 34 has been placed upon roller 12 to indicate the direction and amount of rotation of the roller as shaft 32 is rotated in a clockwise direction. In FIG. 2, upon a 90° turn of shaft 32, roller 12 has moved clockwise as shown by arrow 36. Upon an additional 90° turn of shaft 32, roller 12 continues to rotate in a clockwise direction as indicated by arrow 36 in FIG. 3. Upon an additional 90° turn for a total 270° turn of shaft 32, roller 12 has reversed its direction of rotation and is now moving counterclockwise, as indicated by arrow 36 in FIG. 4. Upon completion of a 360° turn of shaft 32, roller 12 will have rotated counterclockwise and resumed the position illustrated in FIG. 1. Continued rotation of shaft 32 repeats the reciprocating rotational movement of roller 12. It is to be understood that power shaft 32 could be rotated either clockwise or counterclockwise with roller 12 experiencing reciprocating rotary motion.

Rollers 12 and 14 and tension member 22 are of a compatible material which at their mutual areas of contact allows for rolling friction as the tension member 22 is drawn between the rollers upon movement of frame 10. This type of power conversion is known as the Rolamite principle and is discussed in the aforementioned patents. It is to be additionally noted that while a rotating shaft and crank mechanism are utilized to impart movement to frame 10, other types of mechanisms can be used to cause the fore and aft reciprocating movement of the frame. Also, the degree or amount of rotation of roller 12 can vary and is governed by the roller diameters, the distance between end parts 18 and 20 of frame 10 and the length of reciprocating movement of the frame.

In FIG. 5, the motion transmitting device above discussed is illustrated in a more detailed form. In this embodiment frame 10, which houses rollers 12 and 14 and which is shown connected at one end part 20 by a crank mechanism or lever 30 to a rotating shaft 32, is depicted in a more open construction. Tension member 22 is riveted to the side walls 16 of frame 10 in FIG. 5 and includes cogs which intermesh with teeth 40 formed upon the cylindrical surface of roller 12. The smooth side of tension member 22 contacts roller 14 which retains its smooth cylindrical surface. Teeth 40 of roller 12 and the cogs in tension member 22 are utilized to impart a more positive driving action to roller 12. A shaft 28 is coaxially connected to roller 12 and is journaled in a fixedly position housing 42. Housing 42 includes side walls 44 which are of sufficient expanse so as to overlie at least a portion of roller 14 at all times to prevent roller 14 from slipping laterally out of frame 10 during operation of the motion transmitting device. It is to be understood that in the construction of the motion transmitting device of FIG. 5 various types of flexible tensioning members can be utilized, such as flat belts, V-belts or round belts. As was described for the embodiment of the transmitting device shown in FIGS. 1–4, rotation of shaft 32 in FIG. 5 causes the reciprocating rotation of shaft 28.

In FIG. 6, the motion transmitting device shown in FIG. 5 is included in the drive mechanism for a washing machine. A rotating tub 50 and a reciprocating agitator 52 journaled within tub 50 are shown. Tub 50 is supported by external means which is not shown. A reversible electric drive motor 54 is provided to rotate tub 50 and to oscillate agitator 52. The drive shaft 55 of drive motor 54 carries belt pulleys 56 and 58 which are each interconnected to the driveshaft of a one-directional slip clutch 60. Slip clutches 60 are arranged so that one of the clutches serves to transmit motion upon one direction of rotation of driveshaft 55 and the other clutch serves to transmit motion upon the opposite direction of rotation of the driveshaft. The drive member 57 of tub 50 has a pulley 62 connected thereto. Pulley 62 is connected to pulley 56 of the motor by means of a drive belt 64. Shaft 32, which is connected to the crank mechanism 30 of the motion transmitting device, is also connected to a pulley 66 which is drive connected by a series of pulleys 68, 69 and belts 70, 71 to pulley 58 of the drive motor. In this manner, rotation of drive motor 54 in one direction will cause rotation of shaft 32 and the reciprocating motion of shaft 28 which passes freely through pulley 62 and tub drive member 57 and is connected to agitator 52. Reverse rotation of drive motor 54 causes the rotation of tub 50 with shaft 32 to the motion transmitting device experiencing no rotary motion due to slip clutch 60 at pulley 58. By utilizing means known in the washing machine art, agitator 52 can be disengaged from shaft 28 during high speed rotation of tub 50 so that the agitator is free to spin with the tub as a result of water and laundry forces acting upon the vanes of the agitator.

In FIGS. 7–9, the motion transmitting device is shown in modified form and includes a roller chain and sprocket drive combination within frame 10. Fixedly positioned roller 12 of a sprocket construction having teeth 70. Tension member 22 is a roller chain which passes around roller 12 engaging its teeth 70 and movable roller 14. Roller 14 carries no teeth and contacts tension member 22 at a circular rib 71. Tension member 22 is anchored at each of its ends to frame 10. One end of tension member 22 is pivotally connected to a rod 72 which extends with clearance through end part 18 of frame 10 and which is threaded. A nut 74 is turned onto rod 72 with preferably one or more spring washers 73 or similar biasing means located between the nut and frame end part. A tightening or loosening of nut 74 will vary the tension in tension member 22. Washers 73 will serve as shock absorbing means at the moment of rotation reversal of roller 12. Each roller 12 and 14 includes spool-like circumferential flanges 76 at which, as illustrated in FIGS. 7 and 8, all contact between the rollers takes place during operation of the motion transmitting device. Tension member 22 while maintaining driving contact with the rollers 12 and 14 is not compressed between the rollers. Thus this arrangement as best seen in FIG. 8 prevents the tension member 22, whether of a chain or band construction, from being squeezed between the rollers and thus damaged. In order to prevent the tension member 22 from being squeezed between rollers 12 and 14 and frame side walls 16, spaced rails 78 which form a part of and which extends along each of the side walls are provided. Rollers 12 and 14 contact rails 78 at their flanges 76 during movement of frame 10 with tension member 22, as seen in FIG. 9, fitting with clearance between the rollers and frame side walls. The depth of flanges 76 of each roller 12 and 14 as measured between flange edges 77 and the base 79 of teeth 70 and rib 71 of the rollers is such that all roller to roller contact and roller to rail 78 contact takes place substantially at the neutral axis 80 of the tension member 22 to reduce the opportunity for slippage between rollers and between the rollers and rails. Reciprocating rotary motion of roller 12 and connected shaft 28 is effected through fore and aft movement of frame 10. This may be accomplished by the crank mechanism described in FIG. 5 or some other means such as reciprocating power piston means connected to end part 20 of frame 10.

It is to be understood that the invention above described is not to be limited to the details above given but may be modified within the scope of the appended claims.

What I claim is:

1. A device providing reciprocating rotary motion comprising frame means having spaced apart side walls extending between opposite frame means end parts, a flexible elongated tension member having two end portions and an intermediate portion, said tension member being secured to said frame means and having one of its end portions extending along one said side wall and the other of its end portions extending along the other side wall of the frame means, first and second rollers located within said frame means between said side walls and end parts, said rollers having parallel axes of rotation extending transversely to said tension member, the intermediate portion of said tension member extending about said rollers in an S-shaped configuration, one of said first and second rollers carrying power output means, means securing said one roller in a fixed operable location with said frame means being shiftable relative to said one roller, and means for moving one end part of said frame means relative to said one roller in fore and aft paths along the general direction of said side walls and within a plane of movement transverse to the axis of rotation of said rollers whereby said one roller will experience reciprocating rotational movement about its axis of rotation, each roller being of a general spool-like configuration having spaced diametrically enlarged flanges adjacent the ends thereof, said rollers contacting one another at said flanges in all operative positions of said frame means, said tension member extending between said rollers within the spacing between said flanges, said flanges constituting spacing means for preventing said tension member from being compressed between said rollers.

2. The device of claim 1 wherein the combined depth of said flanges in contact exceeds the thickness of said tension member.

3. The device of claim 1 wherein each side wall of the frame means includes spaced rail parts contacting a roller at its said flanges, said tension member extending between a said roller and frame side wall within the spacing between the rail parts thereof.

4. The device of claim 1 wherein the points of contact between said flanges of the rollers is at the neutral axis of the tension member.

* * * * *